C. PEARSON.
HAY RAKE.
APPLICATION FILED JUNE 2, 1910.
992,384.
Patented May 16, 1911.
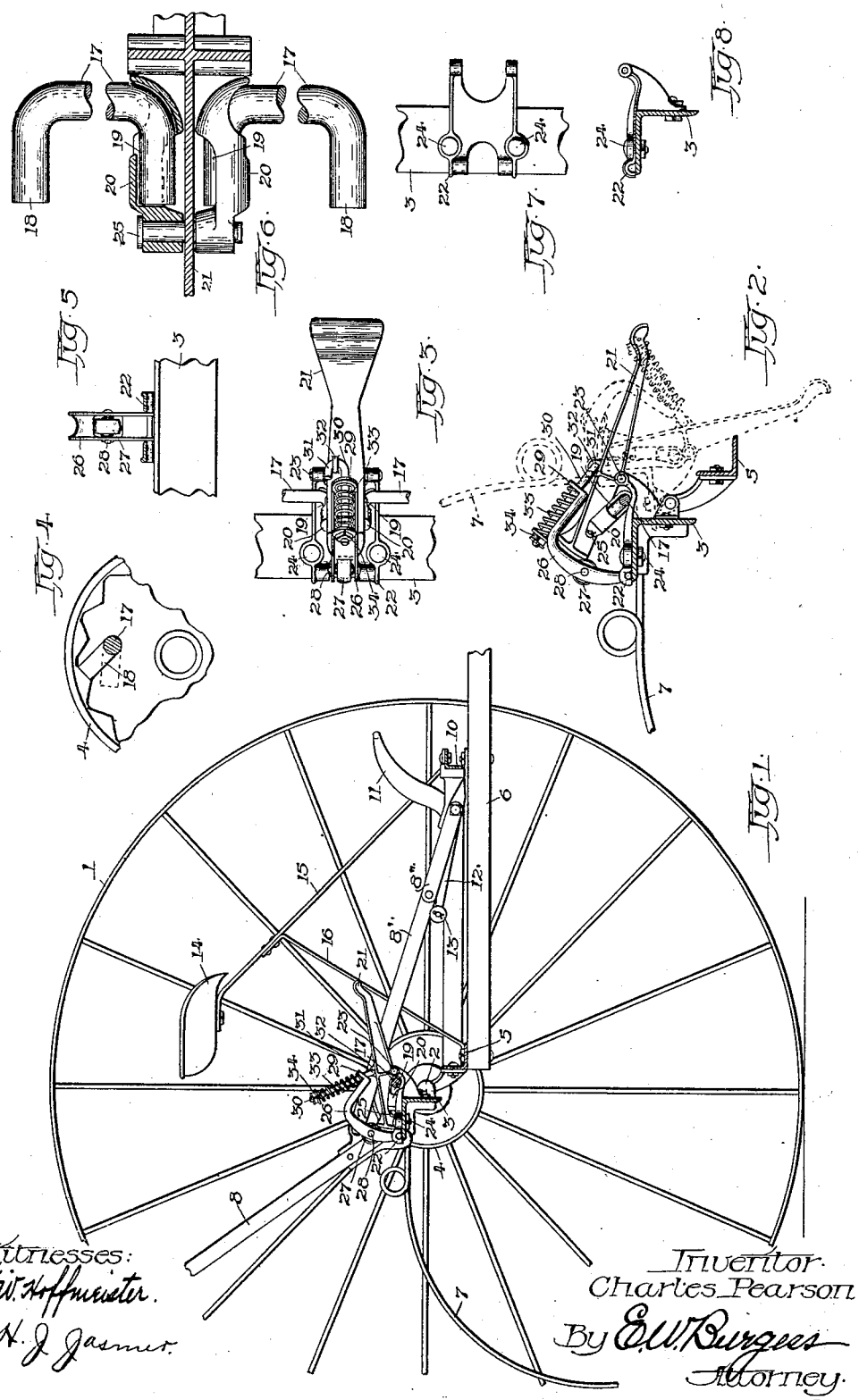
Witnesses:
F. W. Hoffmeister
N. J. Jasmer
Inventor
Charles Pearson
By E. W. Burgess
Attorney

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

HAY-RAKE.

992,384. Specification of Letters Patent. Patented May 16, 1911.

Application filed June 2, 1910. Serial No. 564,670.

*To all whom it may concern:*

Be it known that I, CHARLES PEARSON, a citizen of the United States, residing at Chicago, in the county of Cook and State of Illinois, have invented certain new and useful Improvements in Hay-Rakes, of which the following is a specification.

My invention relates to hay rakes of the self-dump type, and in particular to the tripping mechanism whereby the tooth carrying head is connected with the traction wheels in a manner to cause it to rock about the axis of the wheels in dumping the load, its object being to simplify such mechanism, make it strong and reliable in operation and not liable to become disorganized. I attain these objects by means of the mechanism illustrated in the accompanying drawings, in which—

Figure 1 represents an end elevation of a hay rake, partly in section, having my invention forming a part thereof; Fig. 2 is a detached detail view of Fig. 1, designed to show the tripping mechanism in different operative positions; Fig. 3 is a top plan view of the tripping lever and its associated parts, as shown in Fig. 1; Fig. 4 is a fragment of one of the ratchet wheels that are adapted to be connected with the traction wheels, showing the pawl of the dump shaft in operative position; Fig. 5 is a rear elevation of the trip controlling arm; Fig. 6 is a top plan view, partly in section, designed to illustrate the manner of connecting the trip lever with the rocking pawl shaft; Fig. 7 is a detail drawing representing the trip lever supporting bracket secured to the rake head; and Fig. 8 is an end view of Fig. 7.

The same reference numerals designate like parts throughout the several views.

1 represents one of the carrying wheels journaled upon the stub axle 2 secured to the head 3 and having internal tooth ratchet rim 4 forming part of the hub thereof.

5 represents a draft frame having its rear end pivotally connected with the head, and 6 represents the thills secured to the lower side of said draft frame.

7 represents the rake teeth, that may be connected with the rake by any of the common forms of mechanism permitting them to rock therewith in dumping the load. A common form of toggle link mechanism includes fore and aft arranged bars 8' and 8", having their adjacent ends pivotally connected and their opposite ends pivotally connected with the rake head and the transverse bar 10 of the draft frame mechanism; being operative to lock the head in raking position in a well-known way.

8 is a hand dumping lever secured to the head 3.

11 represents a common form of foot lever pivotally connected with the draft frame and having a rearwardly extending arm 12 provided with a roller 13 that contacts with the lower side of the toggle connecting links in a manner to raise their adjacent ends and permit the rake to be dumped and to control the movement thereof, and 14 represents a seat mounted upon the spring support 15 that is secured to the draft frame and provided with a sustaining brace member 16.

17 represents a divided rock shaft mounted in bearings supported by the rake head and having pawls 18 at opposite ends thereof that are adapted to engage with the ratchet members 4, forming part of the carrying wheels, in a common manner.

The inner ends of the rock shaft are provided with rearwardly extending arms 19 that are received by socket members 20, that have their rear ends pivotally connected with the rear end of a tripping lever 21 that is pivotally connected with the forward end of a bracket 22 by means of a pin 23, the bracket being secured to the rake head by means of bolts 24, and the sockets connected with the tripping lever by means of a pin 25.

26 represents a trip controlling lever having its lower end pivotally connected with the rear end of the bracket 22, and its body portion formed substantially concentric with the axis of the tripping lever and provided with a roller 27 journaled upon a pin 28, the upper end of the trip controlling lever being extended forward and provided with an ear portion 29, having an opening therein that slidably receives a link 30 that is provided with a hook portion 31 at its forward end whereby it is connected with an eye 32 forming part of the tripping lever 21, the rear end of the link being encircled by a compression spring 33 that is operative between the ear portion 29 and a pressure adjusting nut 34 in a manner to yieldingly hold the roller 27 mounted upon the trip controlling lever in contact with the rear end of the tripping lever, the axis of the roller being above the end of the lever when the teeth are in a raking position, and below the end thereof when the lever is pressed downward at its forward end to dump the load, as shown in Fig. 2, the roller being operative as a yielding abutment to hold the lever at either limit of its movement.

In operation, with the rake teeth in raking position, the divided rock shaft is in the position shown in Fig. 1 and by dotted lines in Fig. 4, with the pawl disengaged from the ratchet wheel and the rear end of the tripping lever below roller 27 carried by the trip controlling lever 26. When it is desired to throw into action the dumping mechanism the operator presses downward upon the forward end of the tripping lever 21, thereby turning the divided rock shaft in its bearings and causing the pawls at opposite ends thereof to engage with the ratchet wheels in a manner to rock the tooth carrying head about the axis of the carrying wheels, as shown by dotted lines in Fig. 2, to dump the load, and when it has reached a predetermined forward movement, the tripping lever contacts with the draft frame in a manner to turn the rock shaft in an opposite direction, which movement releases the pawls and allows the head and teeth to assume a raking position.

What I claim as my invention, and desire to secure by Letters Patent, is:

1. A tripping mechanism for hay rakes including, in combination, a rake head, a pawl carrying rock shaft mounted upon said head, a tripping lever connected with said rock shaft and pivotally mounted upon said head, and a trip controlling lever pivotally mounted upon said head and yieldingly held in contact with the rear end of said tripping lever.

2. A tripping mechanism for hay rakes including, in combination, a rake head, a pawl carrying rock shaft mounted upon said head, a tripping lever pivotally mounted upon said head and connected with said rock shaft, a trip controlling lever pivotally mounted upon said head, a roller journaled upon said trip controlling lever and adapted to engage with the rear end of said tripping lever, and a spring connection between the said trip controlling lever and said tripping lever operative to hold said roller in contact with said tripping lever.

3. A tripping mechanism for hay rakes including, in combination, a rake head, a pawl carrying rock shaft mounted upon said head, a tripping lever pivotally mounted upon said head and connected with said rock shaft, a trip controlling lever pivotally mounted upon said head, a roller journaled upon said trip controlling lever and adapted to engage with the rear end of said tripping lever, a link connection between the trip controlling lever and said tripping lever, and a compression spring surrounding said link and operative to hold said trip controlling lever toward said tripping lever.

4. A tripping mechanism for hay rakes including, in combination, a rake head, a pawl carrying rock shaft mounted upon said head, a bracket secured to said head intermediate its ends, a tripping lever pivotally connected intermediate its ends with the forward end of said bracket and connected with said rock shaft, a trip controlling lever pivotally connected with the rear end of said bracket and having its body portion substantially concentric with the axis of said tripping lever, a roller journaled upon said trip controlling lever and adapted to engage with the rear end of said tripping lever, a link connection between said trip controlling lever and said tripping lever, and a compression spring surrounding said link and operative to hold said trip controlling lever toward said tripping lever.

5. A tripping mechanism for hay rakes including, in combination, a rake head, a divided pawl carrying rock shaft having outwardly turned arms near its middle, sockets receiving said arms, a bracket secured to said head intermediate its ends, a tripping lever pivotally connected intermediate its ends with the forward end of said bracket and with said sockets in rear of the axis of said lever, a trip controlling lever pivotally connected with the rear end of said bracket and having its body portion substantially concentric with the axis of said tripping lever, a roller journaled upon said trip controlling lever and adapted to engage with the rear end of said tripping lever, a link connection between said trip controlling lever and said tripping lever, and a compression spring encircling said link and operative to hold said trip controlling lever toward said tripping lever.

CHARLES PEARSON.

Witnesses:
RAY D. LEE,
FRANK BELKA.

---

Copies of this patent may be obtained for five cents each, by addressing the "Commissioner of Patents, Washington, D. C."